Patented Aug. 19, 1952

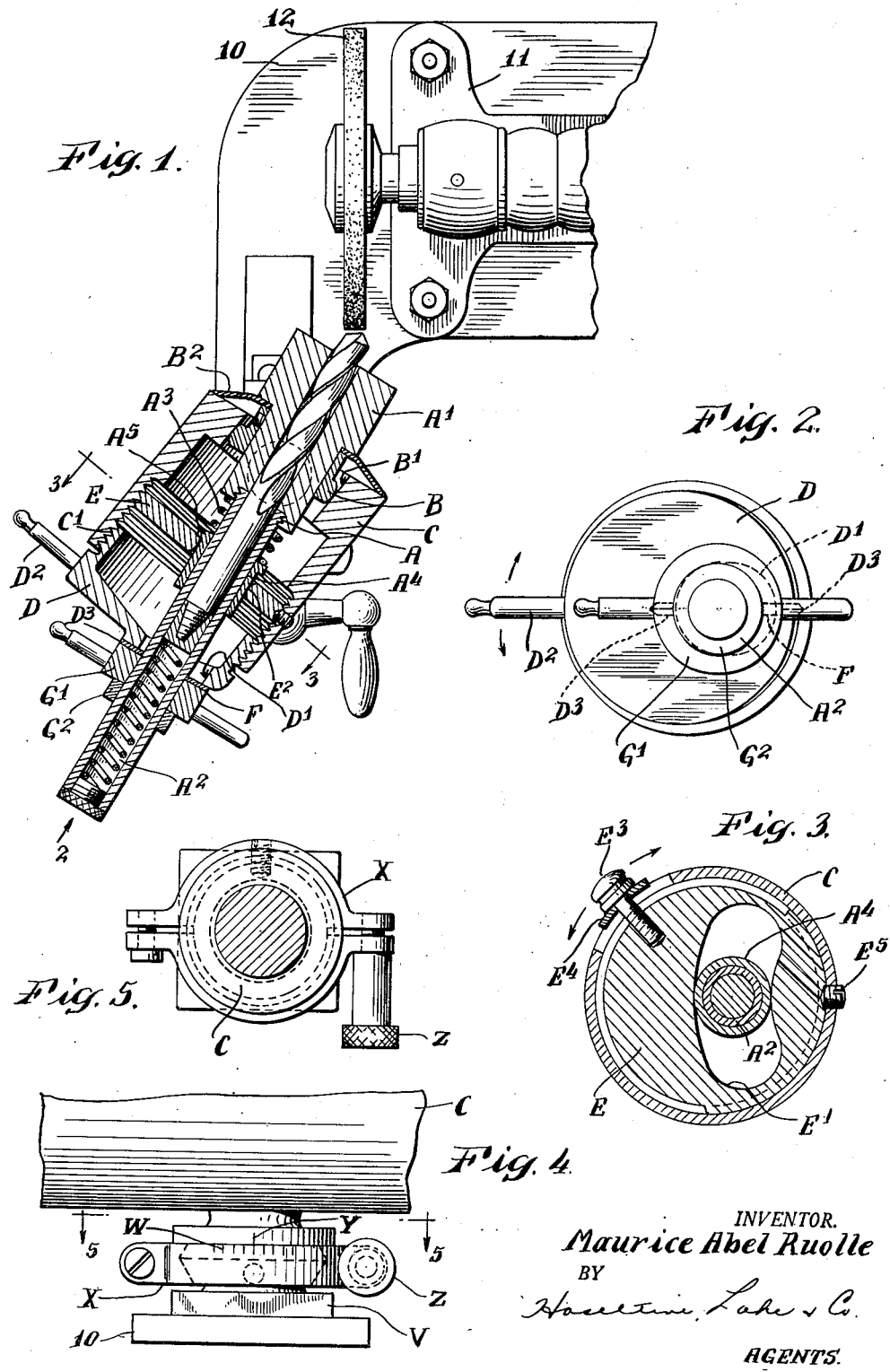

2,607,172

UNITED STATES PATENT OFFICE 2,607,172

LEFT OR RIGHT HANDED TWIST DRILL GRINDING MACHINE ACCORDING TO VARIABLE CLEARANCE ANGLES

Maurice Abel Ruolle, Paris, France

Application July 29, 1947, Serial No. 764,480
In France March 4, 1942

Section 1, Public Law 690, August 8, 1946
Patent expires March 4, 1962

5 Claims. (Cl. 51—219)

The present invention relates to drill grinding machines, and more particularly to a grinding machine for sharpening twist drills, enabling a strictly concentric and symmetrical grinding relative to the drill axis, so that drills sharpened in this way produce smooth holes having the exact dimension of the drill used.

According to the present invention in a grinding machine a device for sharpening twist drills comprises means for clamping a drill, a sleeve forming an extension of said clamping means, a support adjustable with respect to the grinding wheel, a bearing assembly mounting said clamping means in said support which is constructed and arranged for universal movement of said clamping means and for movement of the latter axially relative to said support, guide means for said sleeve comprising two parts movable relatively to one another to cause the clamping means to nutate about the bearing assembly thereby to tilt the axis of the drill relatively to the grinding wheel and means permitting turning of the clamping means and the drill about the longitudinal axis of the drill.

The present invention also comprises a device for holding twist drills when grinding the same, comprising a drill holder having means for clamping a drill, a sleeve forming an extension of said clamping means, a bearing assembly holding said clamping means, a support adapted to be mounted on the grinding machine in an adjustable manner with respect to the grinding wheel, said bearing assembly being arranged between said clamping means and said support and being constructed for universal movement of said clamping means and for movement of the latter axially relative to said support, a guide member arranged on the back of said support and provided with an eccentric opening through which said extension extends, and a slotted plate rotatable in said support, said extension extending through the slotted plate, whereby the angle between the axes of the clamping means and said support can be altered by rotating said plate and guide member relatively to said support.

In order that the invention may be clearly understood, the same will now be described with reference to the accompanying drawings which show, by way of example, a machine in accordance with the present invention for sharpening a two-fluted drill. In the drawings:

Fig. 1 is a plan view, partly broken away and in section, of a drill grinding machine embodying the present invention;

Fig. 2 is a detail view, on a larger scale, of a portion of the machine of Fig. 1 and viewed in the direction of the arrow 2 on Fig. 1;

Fig. 3 is a sectional view taken along the line 3—3 of Fig. 1 and on a larger scale;

Fig. 4 is a fragmentary side elevational view of the base portion of a drill supporting device included in the machine of Fig. 1; and Fig. 5 is a horizontal sectional view taken along the line 5—5 of Fig. 4.

In the embodiment illustrated, the machine comprises a frame 10 having a stand 11 mounted thereon for rotatably supporting a grinding wheel for sharpening twist drills and an adjustable support device for supporting the drill during grinding.

The grinding support device comprises a drill carrying member A, provided with a clamp or chuck A1 for securing the drill therein, and mounted in a generally cylindrical casing C by a bearing assembly which is constructed and arranged for universal movement of the drill carrying member as well as for movement of the latter axially relative to the casing C. In the illustrated device, such a bearing assembly is provided by a ring B on the clamp which is formed with a peripheral surface in the form of a section of a sphere and engages slidably and rotatably in the right cylindrical internal surface B1 of the casing C. While the surface of double curvature is formed on the ring B fixed to the clamp, it is to be understood that the same freedom of movement of the drill holder may be obtained by reversing the relationship of the two parts of the bearing assembly so that the ring on the clamp is of right cylindrical configuration and engages in a suitable annular bearing surface of double curvature formed at the interior of the casing. The drill-carrier member A has a shank A2 extending through a specially-contoured aperture E1 acting as a cam (see Figure 3) formed in a guide flange E adjustably mounted in the casing C and cooperating with an oblong driving aperture D1 (Figure 2) formed radially in a drive flange D cooperating through a threaded connection C1 with the casing C.

The guide flange E is screwed into the casing C and the cam-aperture E1 is of arcuate oblong form with a radial axis of symmetry (see Figure 3). The walls of said aperture are rounded off as shown at E2 in Figure 1 and provide a guiding cam for a bushing A4 slidably mounted on the shank A2 of drill-carrier A and bearing against the said flange by means of a peripheral flange A5 of the bushing. An adjusting knob E3 extending through a circumferential slot formed through the casing C (Figure 3) makes it possible to alter the angular setting of the flange E; a vernier E4 integral with the knob and riding in front of a calibrated scale engraved on the casing indicates the angular setting imparted to the flange E. A grub screw E5 is provided for blocking the said flange in its adjusted setting relatively to the casing C (Figure 3).

The drive or control flange D is provided with a control lever D2. It is formed in its outer face with a radial groove D3 aligned with the oblong aperture D1 and divided thereby into two sections (see Figure 2). The said groove provides a recess for housing a radial tooth F provided on the end surface of a ring G1 adapted to be secured in either of two different angular settings on the shank A2 of drill-carrier A, and axially abutted against a ring G2 rigid with the said shank (see Figures 1 and 2). A spring A3 interposed between bushing A4 and clamp A1 retains the drill-carrier A in a position such that the tooth F cooperates with the groove D3 and a flexible protecting disc B2 clamped in between the clamp A1 and the ring B protects the device against the grit discharged during a grinding operation.

Owing to the cooperation of shank A2 with, on the one hand, the camming aperture E1 in guide-flange E and, on the other hand, drive aperture D1 in drive flange D, and as a result of the contour imparted to the said camming aperture, any angular movement of the drive flange D, imparted thereto by the operator acting on the lever D2, will cause a drill fitted in the clamp A1 to nutate or turn about its own axis and simultaneously swing about the spherical swivel joint provided by the ring B. Rotation of the drill about its own axis is due to the cooperation of tooth F with the groove D3 of the drive flange, while its oscillating motion about the spherical swivel is due to the contour of the camming aperture E1 which is designed so as to impart an oscillatory motion to the clamp A1 as the rear end of the shank A2 assumes an angular displacement as a consequence of the rotation of the drive flange D.

As the drill-carrier member A swings about the swivel B while it is being driven from the drive flange D, the end of the drill repeatedly travels over a path which brings it into contact with the grinding wheel 12 and produces a curve on the lip of the drill imparting to it the desired clearance angle increasing towards the centre of the drill.

The clearance angle may be altered by angularly displacing the guide flange E relative to the casing C so as to alter the angular orientation of the camming aperture E1. The vernier E4 makes it possible to determine the angular setting of the flange E with accuracy.

After one side of the drill has been completely sharpened or ground, it is merely necessary to draw the drill-carrier A rearwards against the action of spring A3 in order to disengage the tooth F from the part of groove D3 in which it was engaged and to bring said tooth into the other end of said groove. This results in imparting a 180° rotation to the drill so that its other lip will now be in a position to engage the grinding wheel, accurately reproducing the same clearance angle which was previously obtained for the drill-lip first sharpened.

The 180° rotation of the drill will thus ensure that absolutely symmetrical edges are formed which define an angle having its apex exactly at the centre of the drill. The supporting device for the casing C, as illustrated in Figures 4 and 5, is so designed as to provide, first, for a rotation of the said casing about its base to facilitate the insertion of the drill in position, and, second, for the adjustment of the angular setting of the drill relative to the plane of the grinding wheel to allow the drill to be sharpened at different angles. A varnier W, allows such angular position to be adjusted. This vernier may be marked with the designations of the more commonly-used materials riding in front of an index, and will automatically indicate the preferred values of the apical angles for drilling work in such materials. Hence, the user will not have to ascertain the actual angles, but will only be required to know the name of the material proposed to be drilled with the drill he is about to grind.

It will be evident that the drill should occupy, both longitudinally and radially, a position defined by an index on the drill-carrier A in order to engage the grinding wheel at a predetermined point of its path, so as to obtain the desired clearance angle which may vary according to the adjusted setting of the flange E (vernier E4).

The angular position of the tooth F, relatively to the drill-carrying member, should be altered depending on whether the drill to be sharpened is of right or left-hand pitch. For this purpose the ring G1 carries an index mark, not shown, whereas the ring G2 carries two marks, not shown, preferably lettered R (for right) and L (for left) respectively.

The ring G2 is permanently secured on the rod A2 of the drill-carrier member, while the ring G1 is securable on the rod A2 by means of a knurled screw, not shown, at either of the positions for which the index-mark on ring G1 coincides with one or the other mark on the ring G2, depending on whether a right or left-pitched drill is to be sharpened.

The purpose of these two settings is to present the drill as it first engages the grinding wheel along the path followed by its end, such that the curve described by the said path during its contact engagement with the grinding wheel will ensure that the correct clearance angle is obtained in either case.

The casing C is mounted on its base V for rotation about a vertical axis and may be secured on its base in different positions according to a scale W on a split clamping ring X fixed relative to the base, the casing having an index Y and the clamping ring being releasable by a screw Z (Figures 4 and 5). The base V of the casing C is fixed on the frame 10 of the grinding machine. Different positions of index Y on scale W will correspond to different angles for the tip of the drill according to the different materials to be drilled.

The position of the index-member G1 varies according to whether the drill is left-hand or right-hand directional.

What I claim is:

1. A device for holding twist drills when grinding the same, comprising a support adapted to be adjustably positioned relative to a grinding wheel, clamping means for holding a drill, a sleeve forming an axial extension of said clamping means, bearing means mounting said clamping means on said support, said bearing means being constructed and arranged for universal movement of said clamping means relative to said support, a guide member mounted on said support and formed with an eccentrically located, elongated cam opening in which said sleeve slidably engages, a control plate rotatably mounted on said support in a plane spaced axially from said guide member and formed with a radial slot terminating at its inner end at a point spaced from the center of turning of the control plate, said sleeve also engaging slidably in said radial slot, and means separably coupling said sleeve to said control plate for rotation with the latter so that rotation of said control plate relative to said support and guide member alters the angular relationship between said clamping means and said support while simultaneously turning said clamping means about its longitudinal axis.

2. A device for holding twist drills when grinding the same, comprising a support adapted to be adjustably positioned relative to a grinding wheel, clamping means for holding a drill, a sleeve extending from said clamping means in axial alignment with a drill in the latter, bearing means mounting said clamping means on said support, said bearing means being constructed and arranged for universal movement of said clamping means relative to said support and for movement of said clamping means axially of said support, a guide member mounted on said support and formed with an eccentrically located, elongated cam opening in which said sleeve slidably engages, a control plate rotatable on said support in a plane spaced axially from said guide member and formed with a radial slot in which said sleeve also slidably engages, and means separably coupling said sleeve to said control plate for rotation with the latter so that rotation of said control plate relative to said support and guide member displaces said sleeve along said cam opening to alter the angular relationship between said clamping means and said support while simultaneously turning said clamping means about its longitudinal axis.

3. A device as set forth in claim 2, wherein said bearing means includes a first bearing surface on said clamping means movably engaging in a second bearing surface on said support, one of said bearing surfaces being right cylindrical in shape and the other of said bearing surfaces having the shape generated by the rotation of a curved line having point contact with said right cylindrical surface.

4. A device as set forth in claim 2, wherein said bearing means includes a right cylindrical axial bore formed in said support, and a ring on said clamping means engaging slidably in said bore and having a peripheral surface defined by a section of a sphere.

5. A device as set forth in claim 2, wherein said coupling means are axially separable and engageable in a plurality of rotated positions of said sleeve relative to said control plate, and including resilient means acting on said sleeve to yieldably urge the latter axially in the direction effecting engagement of said coupling means.

MAURICE ABEL RUOLLE.

REFERENCES CITED

The following references are of record in the file of this patent:

UNITED STATES PATENTS

| Number | Name | Date |
| --- | --- | --- |
| 523,897 | Kenyon | July 31, 1894 |
| 571,336 | Budlong | Nov. 17, 1896 |
| 1,710,647 | Probert et al. | Apr. 23, 1929 |
| 1,714,136 | Probert et al. | May 21, 1929 |
| 2,328,549 | Eich et al. | Sept. 7, 1943 |
| 2,498,701 | Munro | Feb. 28, 1950 |

FOREIGN PATENTS

| Number | Country | Date |
| --- | --- | --- |
| 884,072 | France | Apr. 12, 1943 |